April 6, 1954  R. H. ZEILMAN ET AL  2,674,333
POWER STEERING MEANS SELECTIVELY
OPERABLE FROM SEVERAL STATIONS
Filed Sept. 17, 1945  9 Sheets-Sheet 1

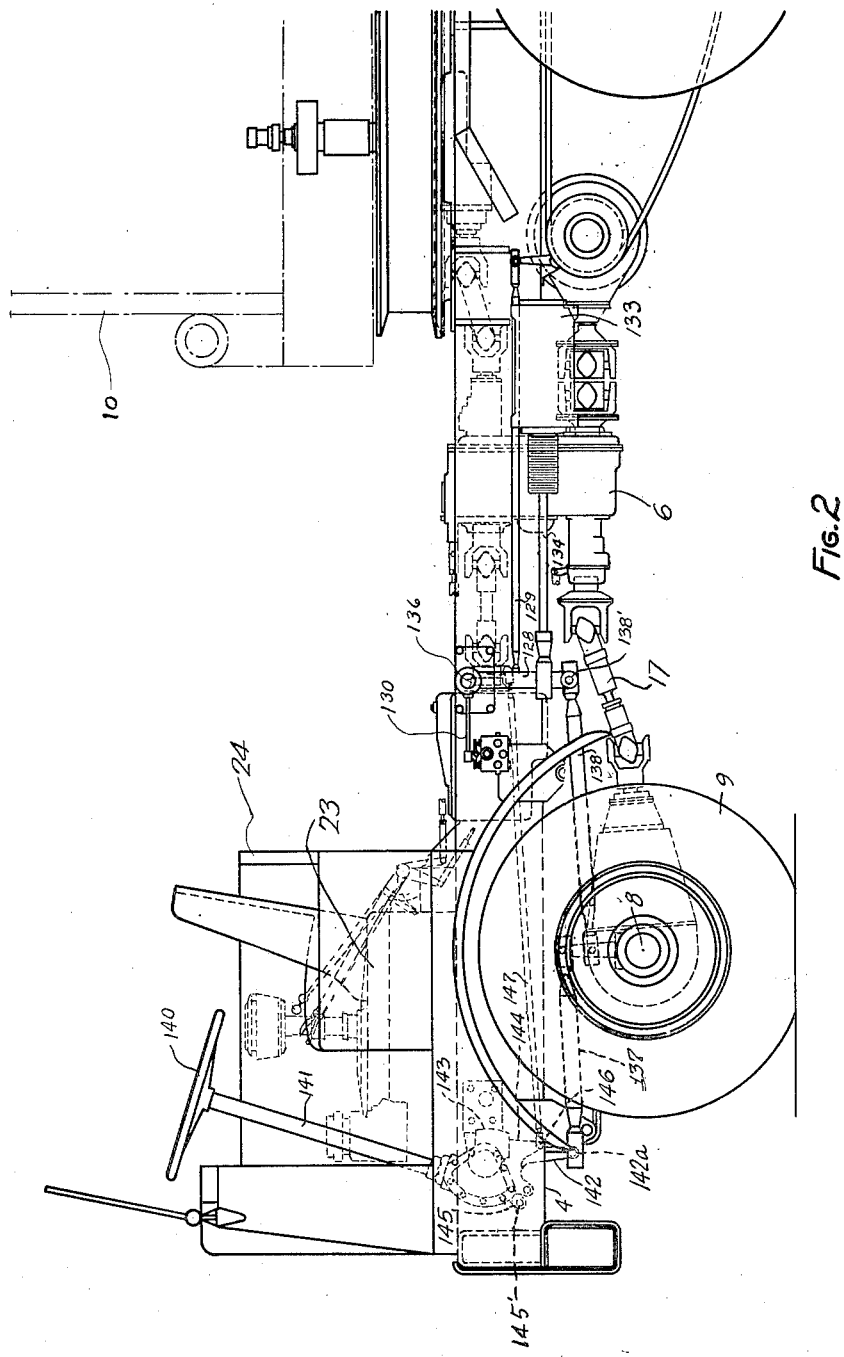

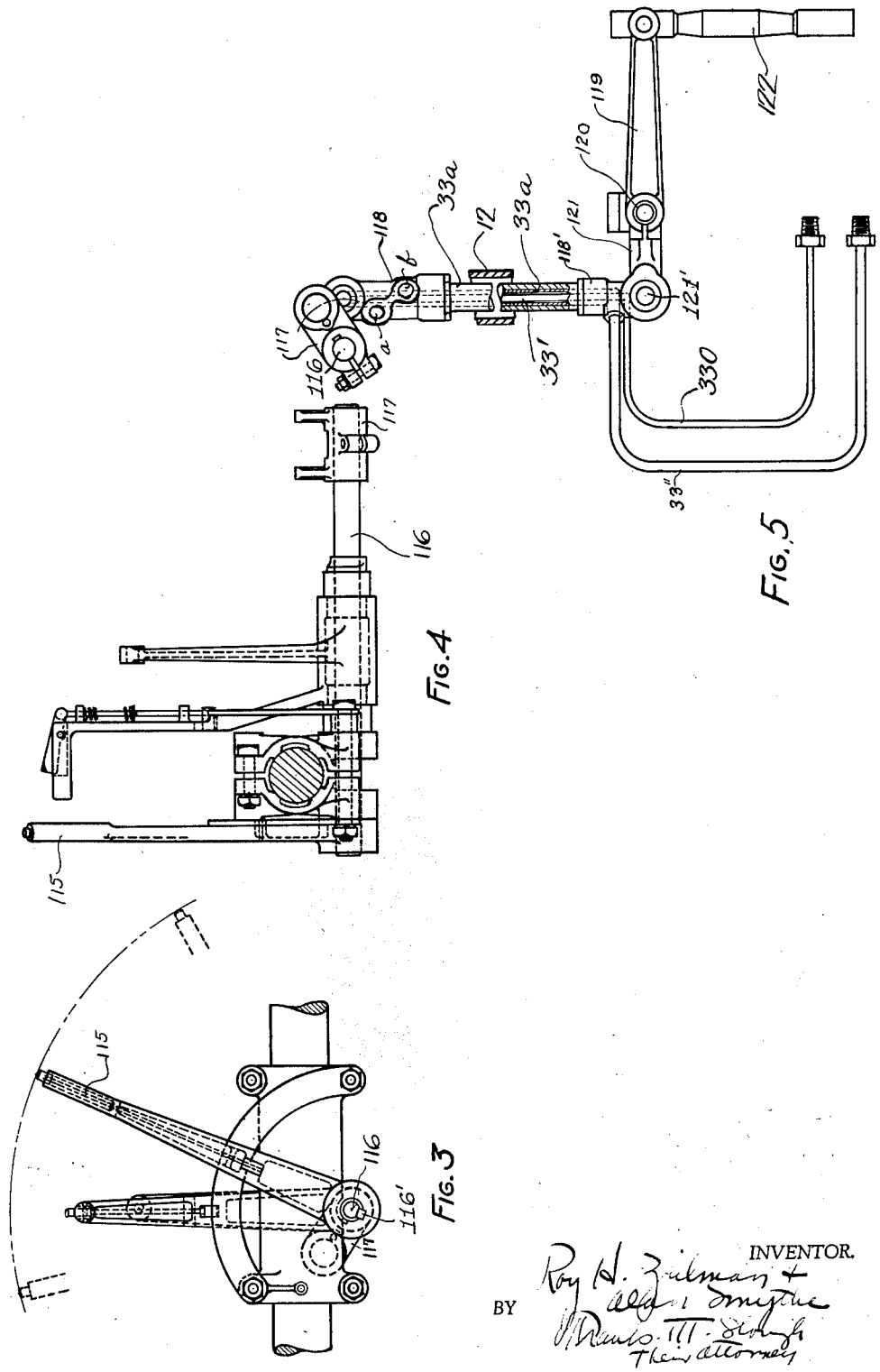

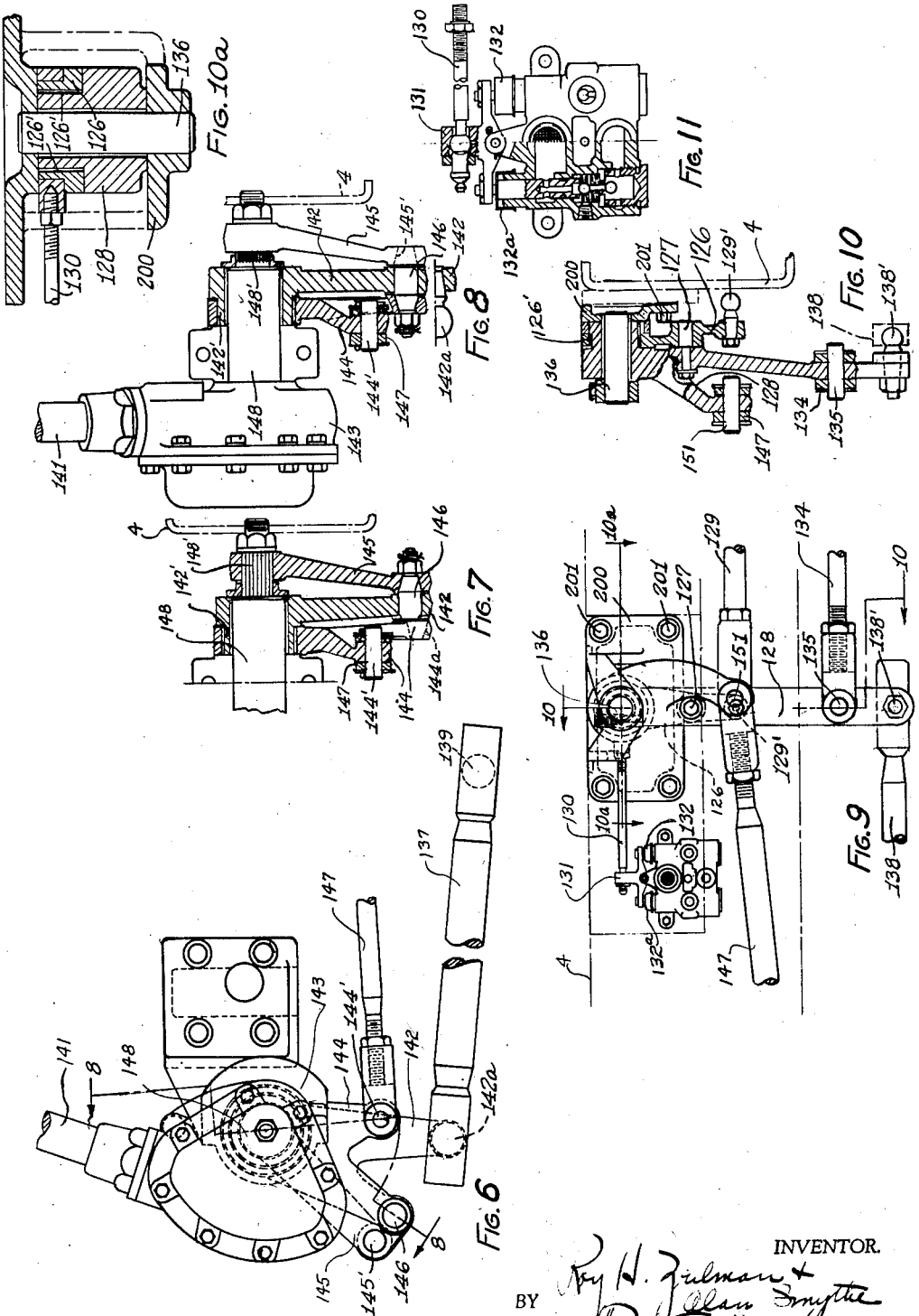

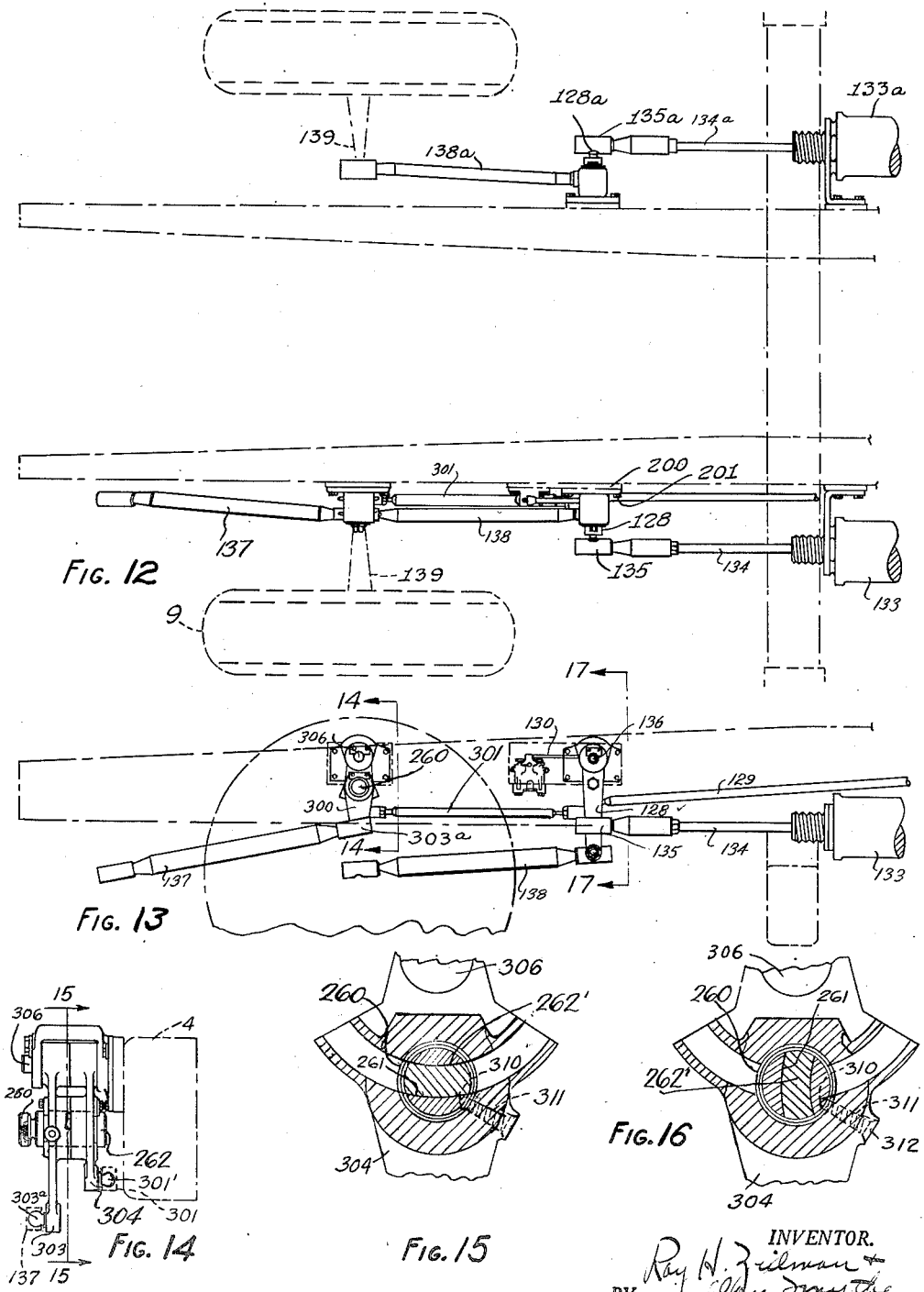

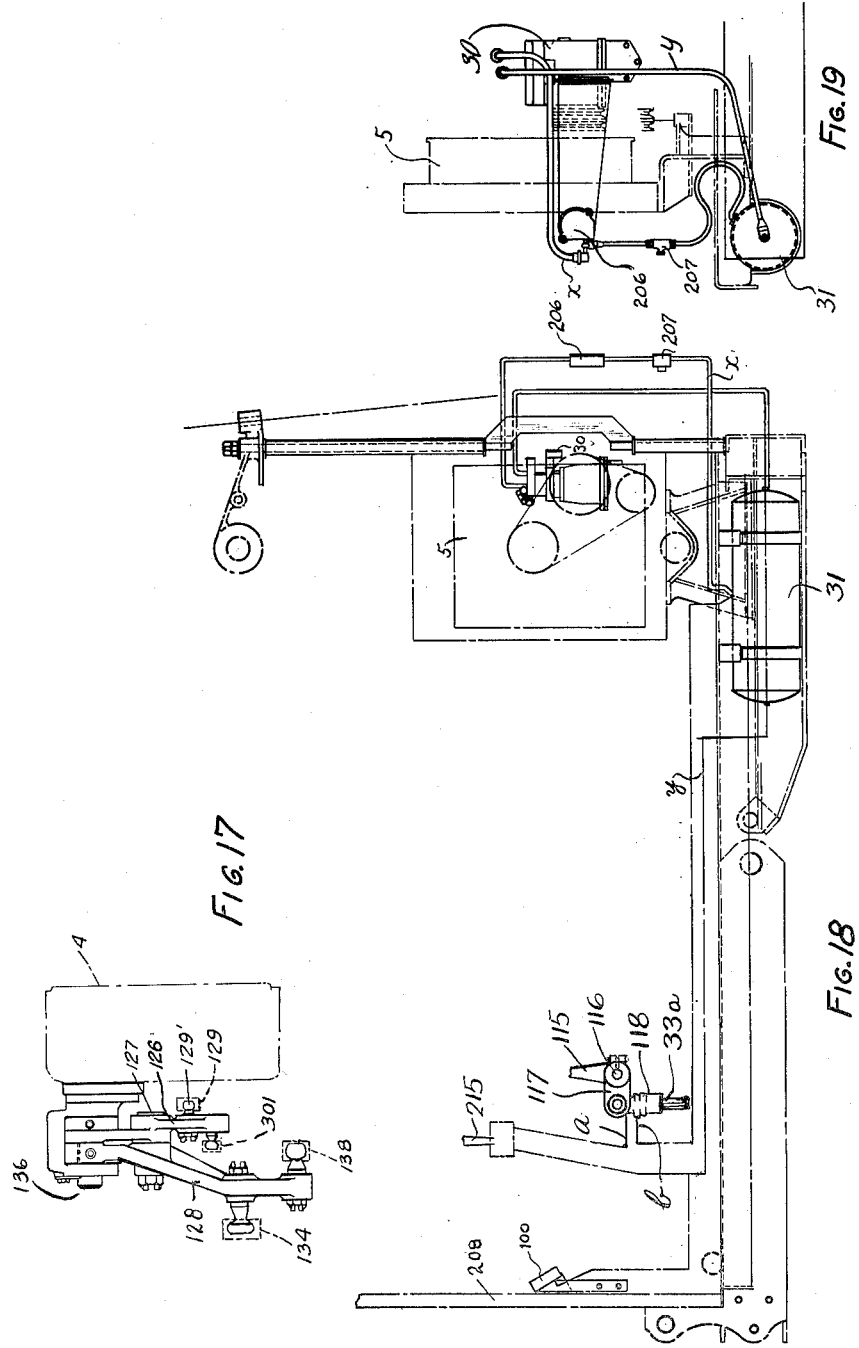

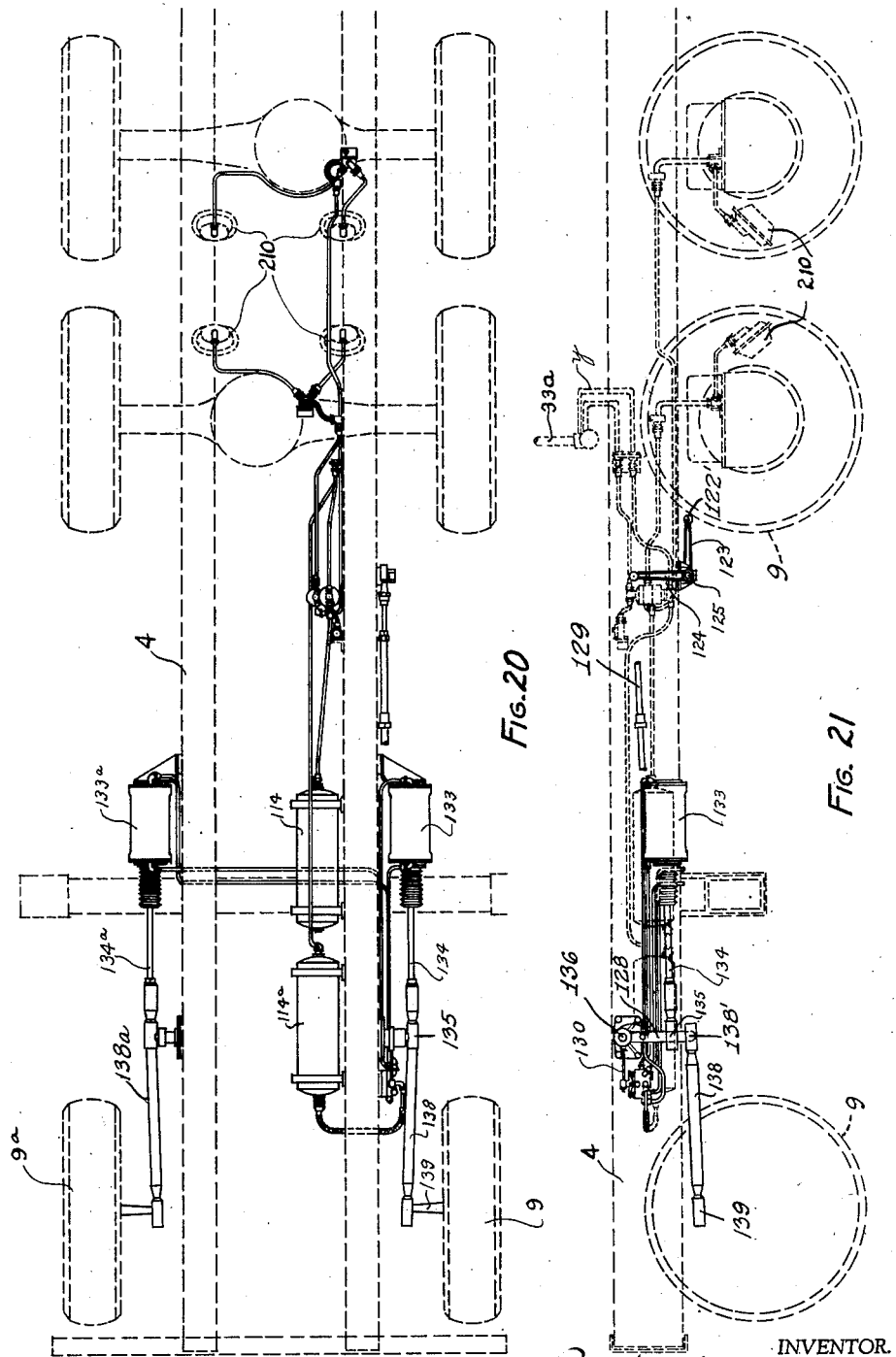

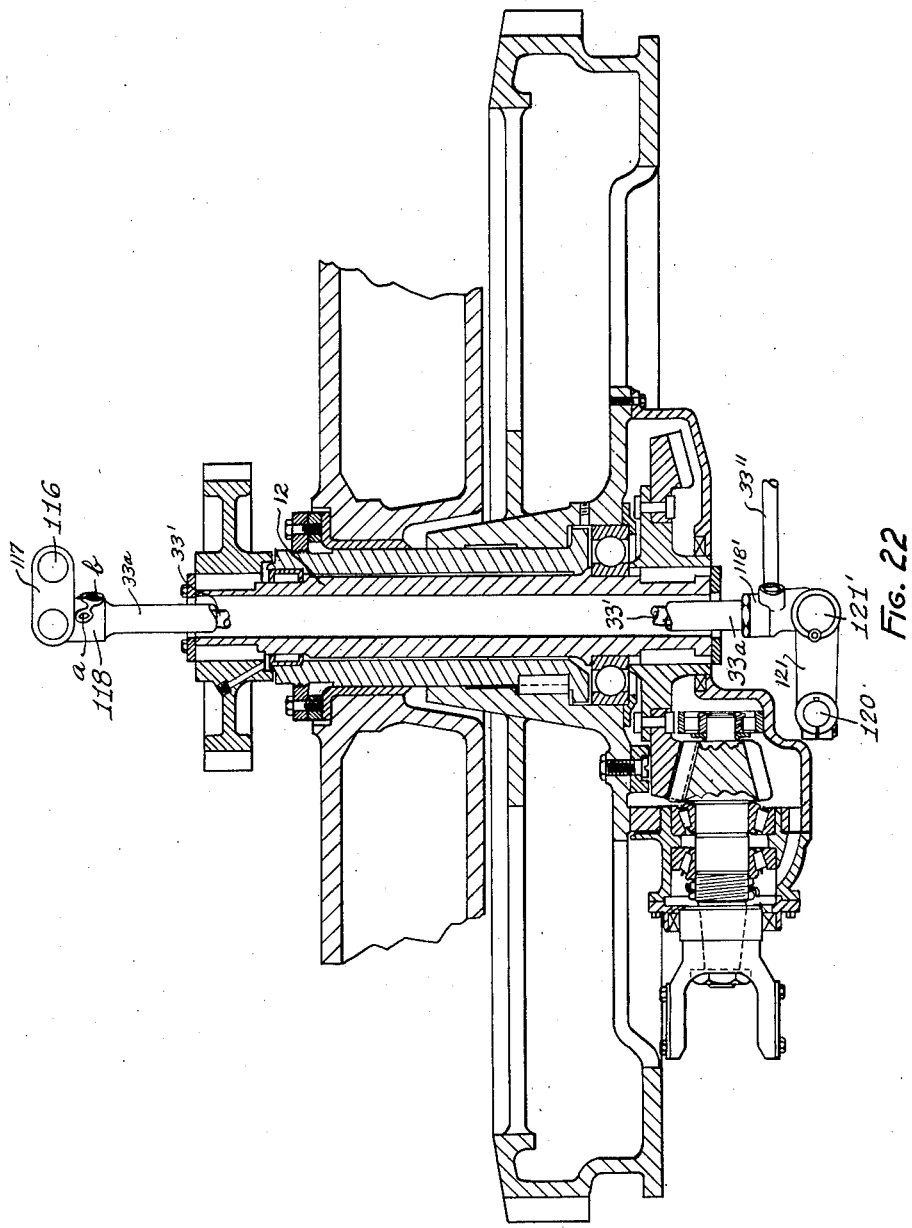

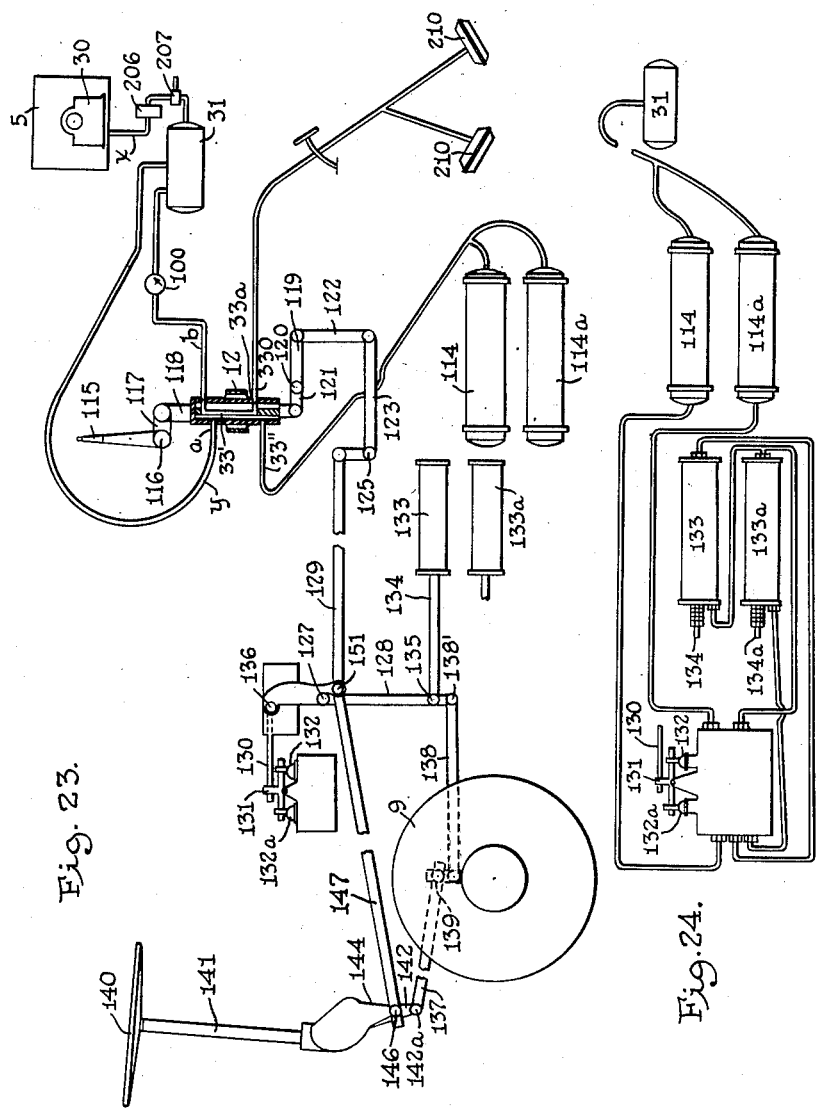

Patented Apr. 6, 1954

2,674,333

UNITED STATES PATENT OFFICE 2,674,333

POWER STEERING MEANS SELECTIVELY OPERABLE FROM SEVERAL STATIONS

Roy H. Zeilman and Alan Smythe, Elyria, Ohio, assignors to The Thew Shovel Company, Lorain, Ohio, a corporation of Ohio Application September 17, 1945, Serial No. 616,868

5 Claims. (Cl. 180—79.2)

Our invention relates to mobile cranes and relates more particularly to the provision of an improved chassis or undercarriage of the automotive type for revolving excavators and load handling cranes of the type comprising a revolving superstructure, a boom attached thereto and an excavating bucket or load handling means associated with the boom, said chassis involving a basic structure susceptible to conversion to produce variant types of such machines.

It is an object of our invention to provide improved steering apparatus for said chassis.

Another object of our invention is to provide in a crane of the above type, a pair of alternately operable operator's stations, each comprising steering controls wherefor steering may be achieved from a more forwardly disposed automotive station or from a more rearwardly disposed "work" station.

Another object of our invention is to provide a steering means, controllable from the operator's station, whereby the cut of the vehicle steering wheels bears a direct relation to the movement of the steering control lever, and movement of the steering control lever and movement of the steering wheels due to forces external to the vehicle is resisted if the control lever is held in a fixed position.

It is also a purpose of our invention to provide a steering means, controllable from the operator's station, whereby the cut of the vehicle steering wheels bears a direct relation to the movement of the steering control, and is not effected by rotation of the superstructure.

Other objects of our invention and the invention itself will be apparent to those skilled in the art to which our invention appertains by reference to the accompanying drawings illustrating certain embodiment structures of our invention which are described in the subsequently following specification relating thereto, in which drawings:

Fig. 2 illustrates a crane wherein the propelling and steering functions may be accomplished either from the driver's position, or from the crane operator's position;

Fig. 3 is a side elevational view of certain manually operable controlling means for controlling the operation of the fluid system of the foregoing figures;

Fig. 4 is an end elevational view of the apparatus of Fig. 3;

Fig. 5 is an elevational view of certain elements of the said fluid system adapted to be controlled by the apparatus of Figs. 3 and 4;

Fig. 6 is a view of a mobile front drive mechanism for accomplishing the steering of the form of Fig. 2 from the driver's station;

Fig. 7 is a view partly in section showing certain parts of Fig. 6 in locked engagement to effect front steering;

Fig. 8 is a view taken on the line 8—8 of Fig. 6 but showing the parts in locked engagement to effect steering from the crane operator's position;

Figure 1:
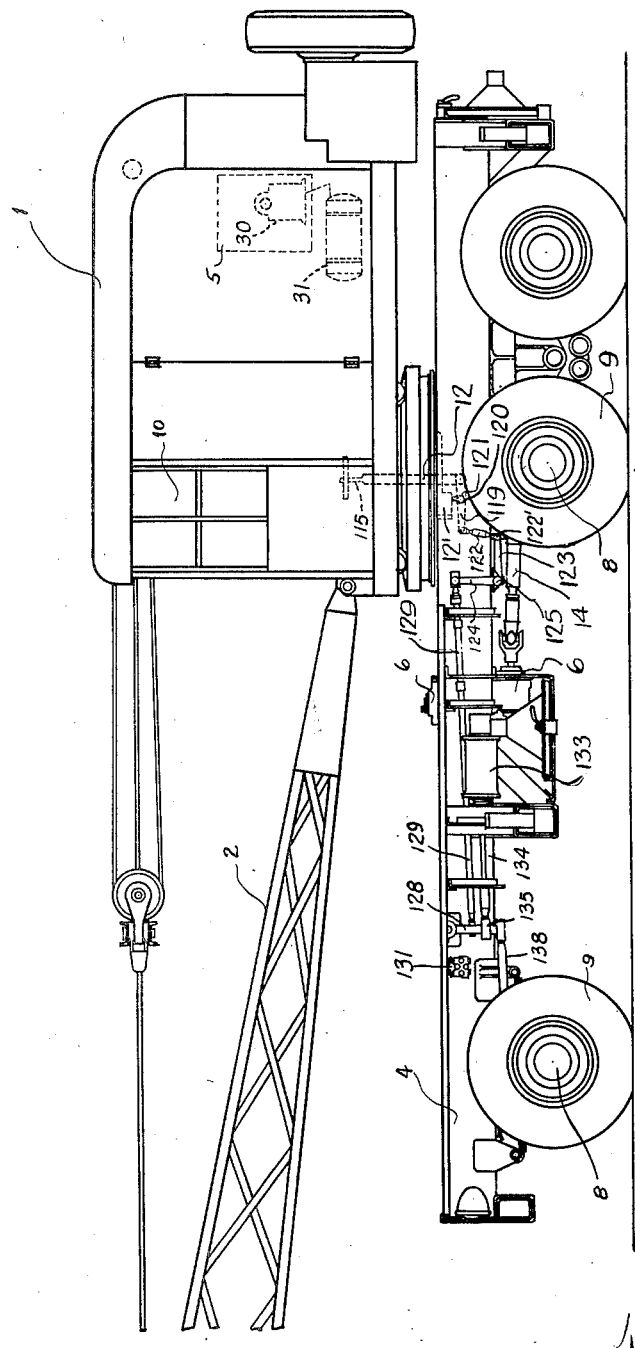
Fig. 1 is a side elevational view illustrating a mobile chassis having embodied therein improvements of our present invention.

Figs. 9, 10, 10a and 11 are views of the valve operating mechanism and associated leverage with which the steering controls of Figs. 6 to 8 and also of all forms illustrated herein are associated, with Fig. 10 being a view taken on line 10—10 of Fig. 9 and Fig. 10a being a view taken on line 10a—10a of Fig. 9;

Figs. 12 and 17 inclusive are views of an alternative embodiment of a mobile front drive mechanism for accomplishing steering from the driver's station of the form of Fig. 2, with Figs. 14 and 17 being views taken on lines 14—14 and 17—17 of Fig. 13 and Fig. 15 being a view taken on the line 15—15 of Fig. 14;

Figs. 18 and 19 are diagrammatic views of portions of the said fluid system;

Figs. 20 and 21 are plan and side elevational views, respectively, of certain essential elements of a fluid pressure system preferably employed in connection with the mobile crane mechanisms of the foregoing figures;

Fig. 22 is a transverse sectional view of the center pin construction;

Fig. 23 is a schematic view of the routing of the pipes for the steering operations of applicants' invention; and Fig. 24 is a further schematic view of the routing of the pipes for the steering operations.

Referring to the drawings, in all of which like parts are designated by like reference characters, Fig. 1 shows an excavator or load handling crane comprising a full revolving superstructure 1, a boom 2, excavating or load handling means (not shown) and a chassis 4. Power is supplied by a prime mover 5, as shown in United States patent to Wilson No. 2,022,168, through transmission means 12' to a transfer case 6 and drive shafts 14 and 17 (Fig. 2) to axles 8, and wheels 9. Further reference may be made to our co-pending application Serial No. 139,444 filed January 19, 1950, for a description of the propulsion and propelling means of the vehicle of our invention.

Our invention, as shown in Figs. 1 and 2 is embodied in a vehicular construction wherein the chassis is either self-propelled by engine 5 and/or propelled from the automotive source of power 23, as in Fig. 2, and power steering means, are provided, as well as a control therefor, from both the crane operator's station 10, or from the driver's station 24 in Fig. 2.

Steering is accomplished, in all the embodiments shown in the drawings, from the crane operator's station, by means of the fluid steering system of Figs. 1, 2, 3, 4, 5, 9 to 10a, 11, 12, 18, 19, 20, 21, 22, 23 and 24, as hereinafter described. Steering is accomplished by steering controls at the driver's station 24 (or from the crane operator's station) in the embodiments of Figs. 2, 6–11 inclusive, 12–17 inclusive and 23. The steering controls at the driver's station may be rendered effective or ineffective whenever it is desired to substitute the same for the steering controls at the crane operator's station or to utilize the controls at the crane operator's station by either means shown in Figs. 6 to 8 inclusive or Figs. 12 to 16 inclusive.

A description of the fluid steering system for steering from the crane operator's station will now follow:

Fluid power is supplied for steering, as best illustrated in Figs. 17 to 19 inclusive, 23 and 24, from the crane operator's station 10, by an air compressor 30, said compressor driven by the engine or other prime mover 5, and compressed air being communicated therefrom through tube $x$ to receiver 31, swivel joint 118, tube 33', and receivers 114 and 114a in the chassis.

The air reservoir or receiver tank 31 is mounted upon the revoluble platform and air is supplied from the compressor 30 to said receiver through the line $x$, the pressure in said line being, at all times, limited by virtue of the provision of a pressure responsive engine speed governing regulator device 206, Fig. 19, which, in a well known manner, modifies the effect of the usual engine governor to decrease the speed of the engine, indicated at 5, to an appropriate speed to maintain the pressure in the line $x$ at the maximum predetermined by the adjustment of the governor regulator 206.

At 207, also, there is indicated the interpositioning of an exhaust type safety valve in the line $x$, the function thereof being to more quickly reduce the pressure in the line $x$ than the regulator valve 206 can accomplish due to the relatively slow decrease in speed which can be effected by said regulator due to the inertia of the heavy engine parts.

The pressure in the line $x$ is communicated through conduit $y$ to a pressure gauge 100 on the instrument panel 208 at the crane cab operator's station 10, in the usual manner.

At 215, Fig. 18, an operator controllable valve is indicated, subject to the control of the operator for steering by air pressure power supplied from the receiver 31 through a tube, Fig. 5, which comprises a rigid outer pipe 33a within which there is telescoped a smaller tube 33'. Through the line 330 (Fig. 23), air pressure power is delivered to the wheel brakes 210, one of which is disposed in operative relation to the brake band of each of the vehicle wheels and is delivered more importantly to the rear vehicle wheels, through appropriate connection lines, shown in Figs. 20, 21, and 23.

The inner and outer concentric pipes 33a and 33', respectively, in turn, are loosely telescoped within the rotatable vertical propeller shaft 12, as best shown in Fig. 22, a fragment thereof being merely indicated in Fig. 5, and being elsewhere indicated in Figs. 1, 2, 22 and 23.

The innermost air conducting pipes 33' and 33a are rigidly connected together mechanically at their upper and lower ends but without any intercommunication between the interior of the pipe 33' and the pipe 33a, there being flexible extensions at the ends of both conduit passages, as indicated at 33'' and 330, Fig. 5, and as represented by the horizontal lines $a$ and $b$, Fig. 18, for the upper end.

Incidentally, as elsewhere herein related, the entire pipe assembly comprising the outer pipe 33a and the inner pipe 33' is vertically longitudinally reciprocable in order to mechanically oscillate the lever 119, shown in Fig. 5, whereby the mechanical link 122 may be longitudinally reciprocated for purposes of performing the steering function.

Steering is controlled, as shown in Figs. 1, 3 to 5 inclusive, from the crane operator's station, by movement of a hand lever 115, or wheel, if preferred, said lever 115 transmitting rotary motion to a shaft 116, keyed therewith at 116', and crank 117, which moves a swivel joint and tube assembly 118 in a vertical direction within the cab propeller shaft 12, whereby the tube 33a, which encases the inner tube 33', is reciprocated in either vertical direction.

Movement of such swivel joint and tube assembly 118 then in such vertical direction transmits swinging motion to the crank 119 through the shaft 120 and crank 121 swivably connected at 121' to a second swivel joint and tube assembly 118' and a connecting rod 122 transmits this motion through a pivot 122' to a crank 123 and crank 124 through shaft 125 (Fig. 1).

The unitary longitudinally reciprocable assembly 118, which is longitudinally reciprocable to communicate controlling movement from the steering lever 115 to the steering cranks 119 and 124 and valve operating cranks 128, 129 and 130, to operate the steering control valve, shown in Fig. 11, and therein generally indicated at 132 and 132a, and additionally supplying two concentric non-rotatable conduits for supplying compressed air for steering and braking the wheels, is, per se, novel.

The crank 124 actuates a shaft 129 which oscillates the "wobble" lever 126, shown in Figs. 9, 10 and 10a, about the fulcrum 127 on lever 128 through the connecting rod or shaft 129 (Fig. 1) which is pivotally connected to said lever 126 at 129'. Connecting rod 130 pivotally attached to an extending end 126a of the lever 126 as best shown in Fig. 10a then activates a rocker arm 131 to operate either the valve 132 or valve 132a to open and admit air from the air tank 31 or receiver 114 (Figs. 20, 21, 23 and 24) to the relatively opposite ends of cylinders 133 and 133a to exhaust any air trapped therein by the pistons (Figs. 2, 9, 10, 12, 13, 23 and 24).

Generally speaking, the levers of Figs. 3 and 4 are mounted on the rotatable crane superstructure in the manner shown for similar levers in the prior patent to E. J. Wilson, No. 2,090,044 of November 16, 1937.

Piston rods 134 and 134a are pivotally connected to cranks 128 and 128a, respectively, at 135 and 135a (Figs. 20 and 21), and movement of said piston rods causes cranks 128 and 128a to pivot about their fulcrums 136 secured to a plate 200 secured by a plurality of bolts 201 to the chassis 4, and produce movement of draglinks 137, 138 and 138a in relatively opposite directions. Draglinks 138 and 138a are connected to wheels 9 and 9a through steering arms 139 and conventional automotive steering wheel spindles, mounted on vertical king pins. The motion of the said draglinks 138 and 138a produces rotary motion in a horizontal plane, in the steering spindle and wheel assembly, which rotary motion causes the wheels 9 and 9a to cut or change their angle with the longitudinal axis of the chassis, and steer the vehicle.

As soon as movement of the hand lever 115 and its associated cranks, shafts and connections is stopped, a further movement of crank 128 produced by air in cylinders 133 and 133a and movement of piston rods 134 and 134a, since valve 132 or 132a is still open and admitting pressure to the cylinders, moves the lever 126 on its fulcrum 127 so as to close the open valve and stop movement of the steering wheels. Due to a limited amount of clearance 126' between "wobble" lever 126 and crank 128 at their relatively telescoped hub portions, the hand lever 115 may only move sufficiently to move the linkage 118, 129, 126 to open valve 132 or 132a before it stops until the cut of wheels 9 and 9a changes, permitting the pistons to move the crank 128 and fulcrum 127, after which hand lever 115 may move further to follow up this movement. In this manner, the degree of cut of the steering wheels 9 and 9a is definitely related to the movement of and controlled by lever 115.

Conversely, any change in the cut of steering wheels 9 and 9a due to an external force, transmits motion to crank 128 through steering arm 139 and drag link 138, the drag link 138 being connected by pin means 138' to the crank 128, and moves fulcrum 127. If hand lever 115 is held in a fixed position, lever 126 rotates on its pivot 127, causing valve 132 or 132a to be opened through rod connection 130, admitting pressure to cylinders 133 and 133a in a manner to oppose motion of wheels 9 and 9a through crank 128, pistons and piston rods 134 and 134a. In this manner, wheel fight shimmy and drifting of the vehicle from its selected course is largely prevented.

While this description deals generally with a power steering device using a fluid as the power transmitting means, electricity may also be used to transmit steering power, if collector rings and brushes are substituted for the swivel joint, switches for the valves, and an electromotive element, such as a motor or solenoid is substituted for the cylinders and pistons.

While this device employs two cylinders for steering, a tie rod may be used in the manner well known to the automotive art to connect the steering knuckles and produce the correct steering geometry. A single steering cylinder may also be used, if desired.

The steering mechanism which has been described hereinbefore has, it must be noted, been controlled solely from the crane operator's station by means of the steering lever 115 mounted adjacent thereto and hence is adapted for use with all forms of our invention as exemplified by the variant cranes and motor cranes of Figs. 1, 2, whereas steering from the driver's station is shown only in the forms of Figs. 2, 6, 7, 8, 9, 10 and 23 shown herein, and, as stated supra, preferably only when the crane is in transit on ordinary highway travel. A description of mechanism for steering from the driver's station now follows:

A preferred arrangement of a front steering apparatus, so-called, as shown in Figs. 2, 6 to 9 inclusive, 23, comprises an automotive steering wheel 140 adjacent the driver's station 24, the steering rod 141 being geared to a steering lever 142, at 143, to transmit steering movement from the wheel 140 through the drag link (Fig. 2) 137 and the steering knuckles 139 to the wheels 9 and 9a. The drag link 137 is secured to the lower end of the steering lever arm 142, as best shown in Fig. 6, by journalling the same upon bearing means 142a.

A lever 144 and crank 145 respectively are disposed on opposite sides of the lever arm 142 and the lever 144 is loosely journalled upon a collar 142' thereof, said collar being rotatably mounted upon the bearing 148. The crank 145 is however securely journalled upon a knurled end portion 148' of the bearing 148 and is bolted through the frame 4. The lower end of said crank 145 is provided with a preferably tapered hole 145' within which a tapered end portion of a pin 146 may be projected, as shown in Fig. 7, to secure the crank 145 and steering lever 142 together. A connecting rod 147 carried by the lever 144 by means of pin means 144' is secured to the crank 128 by a pin 151, said crank 128 pivoting about the fulcrum 136, as stated in connection with the power steering mechanism, as hereinbefore described.

Thus, to achieve front steering, the lever arm 142 and crank 145 are secured together by means of a pin 146 shown in Fig. 7 wherefor the drag link 137 is moved as described by the steering wheel 140 of crane and motor crane.

When it is desired to steer from the crane operator's position, it is merely necessary to reverse the pin 146, inserting the tapered end thereof within the tapered aperture 144a in the lever 144 to secure the levers 142 and 144 together, the same being freely movable about the bearing 148, so that movement of the links 138 and 138a by means of the cranks 128 and 128a is possible without interference.

Alternatively, in lieu of the front steering apparatus of Fig. 6 to 11 inclusive, we may provide front steering apparatus of the type shown in Figs. 12 to 16 inclusive wherein the drag link 137 is pivoted to an intermediate lever mechanism 300, disposed between the front steering shaft 141 and the wobble lever 126 and secured to the frame 4, as shown. Said lever mechanism 300 comprises a pair of levers 303 and 304 pivoting about the fulcrum 306, a connecting rod 301, secured to the lever 304 at one end and to the lever 126 at the other end communicating steering effort from the drag link 137 to the wobble lever 126. The lever 303 is secured at its lower end by pin means 303a to the drag link 137. A pair of drag links 138 are, in this form of our invention, secured to the steering knuckles 139 at their forward ends and the drag link 138, on the left hand side of the vehicle viewing the drawing of Fig. 13 is pivoted at its rearward end to the lower end of the lever 128, as best shown in Fig. 13.

A selector wheel 260 is provided in place of the pin 146, lever 144 and crank 145 arrangement to selectively engage either the front steering mechanism or to permit steering from the crane operator's position. Said wheel 260 is secured to the lever arm 303 and is provided with a movable female member 261 adapted to engage a male member 262' on the cam 262 carried by the relatively shorter rear lever 304 to which the connecting rod 301 is secured as by pin means 301'. A pipe plug 312 is disposed through an aperture in lever 304 and said plug is provided with a spring 311 telescoped thereover and a ball bearing 310 which is adapted to contact the male member 262'.

When it is desired to steer the chassis from the crane operator's position, the rear lever cam is disposed by means of the selector wheel 260 in the position shown in Fig. 15 and the levers 303 and 304 are free to operate independently of each other. When steering is desired to be accomplished from the driver's position, the two levers 303 and 304 are secured together, similarly operating as the pin 146 in the arrangement of Fig. 8, by means of turning the cam 262 as in the position shown in Fig. 16.

Thus, it can be readily understood that steering can be effected as desired from either position, the crane operator's station or from the driver's station and that regardless of where controlled, the valve means 132 will operate to assist in steering and opposing external forces, etc. Also it will be readily understood from the drawings that therefore in a basic chassis structure (Figs. 1, 12, 13, 20, 21) only slight changes to the chassis need be made to produce such variant forms as the structure of Figs. 2, 6 to 9 inclusive and doubtless other combinations and that the automotive steering controls may be rendered effective or disabled at will to either substitute for the power steering or permit same to be controlled from the turntable station.

It will be appreciated that various changes may be made in the various linkages and mechanical elements shown herein without, however, departing from the spirit of our invention and the scope of the appended claims.

We claim:

1. In a mobile shovel, crane or excavator of the automotive type, a chassis having a plurality of tractive wheels associated therewith comprising at least a pair of forwardly disposed steering wheels, a rotatable turntable mounted upon said chassis and having an operator's work station mounted thereon, power steering mechanism for said vehicle adapted to be controlled from the operator's work station on the turntable, said steering mechanism comprising pneumatic ram devices, a source of air under pressure, valve means controlling the flow of air from said source to said rams, a manually operable steering controller and linkage carried by the chassis leading therefrom and movable thereby, crank means, said controller linkage being secured to said crank means, wobble means associated with said crank means, connecting means securing said valve means to said wobble means and said associated crank means, said controller adapted to transmit movement through said linkage and through said crank means and said connecting means to said valve means to open and admit air from said source of air under pressure to relatively opposite ends of said pneumatic ram devices upon the chassis, wheel responsive means connecting said crank means with said steering wheels, each of said ram devices producing steering movement of said steering wheels, said wheel responsive means being responsive to changes in the angle of turning the said wheels, said valve means being operable under the joint control of said controller and said wheel responsive means, said wobble means associated with said crank means adapted to be moved by air pressure from said pneumatic ram devices a limited amount after manual operation of said controller has ceased to close said valve means and stop movement of the steering wheels.

2. In a steering mechanism of the type claimed in claim 1 characterized by said wobble means being adapted to open said valve means admitting pressure to the pneumatic ram devices to oppose motion of said wheels upon movement of said wheel responsive means.

3. In a mobile shovel, crane or excavator of the type having a vehicle chassis supporting propelling wheels therefor, a rotatable turntable mounted upon said chassis and having an operator's work station mounted thereon, a prime mover carried by the chassis and adapted to be driven at relatively low speeds for the working operations as well as steering thereof, the combination of a pair of forwardly disposed steering wheels, a source of air under pressure associated with said prime mover and supplying fluid power for steering when driven by said prime mover to said wheels, pneumatic ram devices, valve means controlling the flow of air from said source to said rams, a manually operable steering controller positioned at the operator's station on the turntable, linkage carried by the chassis leading therefrom and movable thereby, crank means, said controller linkage being secured to said crank means, wobble means associated with said crank means, connecting means securing said valve means to said wobble means and said associated crank means, said controller adapted to transmit movement through said linkage and through said crank means and said connecting means to said valve means to open and admit air from said source of air under pressure to relatively opposite ends of said pneumatic ram devices mounted at opposite sides of said chassis, a piston associated with each ram device producing swivable movement of said steering wheels, wheel responsive means connecting said crank means with said steering wheels, said wheel responsive means being responsive to changes in the angle of turning the said wheels, said valve means being operable under the joint control of said controller and said wheel responsive means, said wobble means adapted to be moved by air pressure from said pneumatic ram devices a limited amount after manual operation has stopped of said controller closing said valve means and stopping movement of the steering wheels.

4. In a mobile shovel, crane or excavator of the automotive type having a driver's station mounted forwardly of the vehicle, a chassis having a plurality of tractive wheels associated therewith comprising at least a pair of forwardly disposed steering wheels, a rotatable turntable mounted upon said chassis and having an operator's work station mounted thereon, power steering mechanism adapted to be driven by a prime mover mounted on said turntable and controlled from the operator's work station on the turntable, a source of air under pressure associated therewith and driven thereby to supply fluid power for steering to said steering wheels, a two-way valve, fluid adapted to be supplied to said valve from said fluid power source, fluid responsive means comprising an element connected to said wheels, a manually operable steering controller positioned at the operator's work station on the said turntable, an automotive steering mechanism comprising an automotive steering control mounted at the driver's station, means adapted to secure said automotive steering mechanism to said steering wheels, when it is desired to steer said vehicle from said forwardly disposed driver's station, said means being adapted to be disabled to render said automotive steering mechanism ineffective when said power steering from the crane operator's position is utilized, actuating means for said valve means responsive to movement of either of said steering controls to dispose same in either of two alternate positions to transmit fluid to said fluid responsive means in either of two ways to cause said wheels to turn in either opposite direction.

5. In a mobile shovel, crane or excavator of the automotive type having a driver's station mounted forward of the vehicle, a chassis having a plurality of tractive wheels associated therewith comprising at least a pair of forwardly disposed steering wheels, a rotatable turntable mounted upon said chassis and having an operator's work station mounted thereon, a prime mover mounted on said turntable, a source of air under pressure associated therewith and driven thereby to supply fluid power for steering to said steering wheels, a two-way valve, fluid adapted to be supplied to said valve from said fluid power source, fluid responsive means comprising an element connected to said wheels, a manually operable steering controller positioned at the operator's work station on the said turntable, an automotive steering mechanism comprising an automotive steering control mounted at the driver's station, steering gear mechanism, a steering lever associated therewith and operable thereby to effect movement of movable means operatively associated with said wheels to vary the angularity of turning of said wheels, said steering lever being adapted to be rendered inoperative or operative by the removal or use of manually removable locking means, actuating means for said valve means responsive to movement of either of said steering controls to dispose same in either of two alternate positions to transmit fluid to said fluid responsive means in either of two ways to cause said wheels to turn in either opposite direction.

References Cited in the file of this patent

UNITED STATES PATENTS

| Number | Name | Date |
|---|---|---|
| 1,267,422 | King et al. | May 28, 1918 |
| 1,544,775 | Plocek | July 7, 1925 |
| 1,855,334 | Brown | Apr. 26, 1932 |
| 1,868,827 | Guy | July 26, 1932 |
| 1,925,893 | Bacon | Sept. 5, 1933 |
| 2,022,168 | Wilson | Nov. 26, 1935 |
| 2,126,404 | McLean | Aug. 9, 1938 |
| 2,176,170 | Flowers | Oct. 17, 1939 |
| 2,176,171 | Flowers | Oct. 17, 1939 |
| 2,233,188 | Ward | Feb. 25, 1941 |
| 2,343,800 | Rauch | Mar. 7, 1944 |
| 2,380,619 | Terrill | July 31, 1945 |
| 2,397,613 | Madsen et al. | Apr. 2, 1946 |
| 2,421,139 | Barnhart | May 27, 1947 |